Feb. 16, 1965 J. RABINOW 3,169,686

MAGNETIC TAPE DATA STORAGE DEVICE

Filed Dec. 14, 1962

INVENTOR.
Jacob Rabinow

BY Joseph A. Genovese & Max L. Libman

ATTORNEYS

United States Patent Office 3,169,686

Patented Feb. 16, 1965

3,169,686

MAGNETIC TAPE DATA STORAGE DEVICE

Jacob Rabinow, Bethesda, Md., assignor, by mesne assignments, to Control Data Corporation, Minneapolis, Minn., a corporation of Minnesota Filed Dec. 14, 1962, Ser. No. 244,625

13 Claims. (Cl. 226—26)

This invention relates to magnetic tape devices and particularly to magnetic tape units of the type used in data processing systems.

Magnetic tape units are widely used as storage media, buffers, etc. in many kinds of data processing systems involving computers, calculators, character reading machines, and others. The more successful units have two storage reels for the tape, a pair of dancers or tensioning device engaging loops of the tape, and a pair of capstan drivers between which the magnetic head or heads are located to be operable with the tape. An arrangement such as this is shown, for instance, in the Goldberg et al. Patent No. 2,867,791. That patent also describes some of the demands on the tape unit, which are made by a computer or the like, and some of the difficulties that are encountered. For instance, the ideal tape unit would be capable of instantly stopping on a single bit recorded on the tape, and instantly starting at the full, design speed. Theoretically these ideals cannot be achieved in a direct manner. One reason is that instantly starting a tape from a rest position to design speed would mean that the instantaneous acceleration of the tape is enormous. A capstan driver tape transport is probably the most satisfactory device to move tape, but when used to approach the ideal instant stop, start and reversal, the tape breaks, it "throws loops" and otherwise behaves unsatisfactorily. Furthermore, when the tape is payed out from one reel and wound on the other, the effective diameters of the tape on the reels continually changes and this introduces other problems which are known in the art.

Possibly, to reduce these or other difficulties with the reel-capstan drive type of magnetic tape a class of machines using a magazine-type tape accumulator has been developed. U.S. Patent No. 2,979,244 exemplifies this kind of machine. One of the main difficulties with the magazine-accumulator type of tape transport is that the accumulator must have a comparatively small capacity to store tape-length. My invention (*a*) overcomes this difficulty in the magazine accumulator type of magnetic unit designed by Pike, and (*b*) provides a new kind of tape unit using the magazine concept of having loose storage of tape (instead of reels) which is discussed later.

Magazine accumulator transports have one (or more) vertical compartment of a width somewhat greater than the width of the magnetic tape. Instead of winding the tape on reels as is now done in many types of conventional tape machines, the compartment supports a stack of double-back, smoothly curved folds arranged in serpentine manner from which and to which the magnetic tape is payed out and fed during the magnetic read, write, and/or erase modes of operation. The preferred means to drive the tape are the same as in reel type machines, i.e., a pair of capstans on opposite sides of the magnetic head or heads and pinch rollers cooperating with the capstans. Briefly, the advantage of the magazine accumulator machine is this: when the tape is accelerated, the only restraining force to the acceleration of the tape is derived from the mass of a short length of tape, i.e., the length of tape from the top of the previously mentioned stack through the capstan driver assemblies. There are no dancers nor tape reels to contend with. In the stopping mode (with or without reversing), the same benefit is obtained because, again, there is only the mass of a short length of the tape to decelerate. Although theoretical instant stopping and instant starting is not achieved, it is more easily and closely approached than with the usual reel-type magnetic tape unit.

One of the major objections to the magazine accumulator tape unit is its comparatively small capacity for tape-length storage. There is a limit on the height of the tape buffer compartment because the tape folds at the bottom of the stack crush if the stack becomes too heavy (tall).

An object of my invention is to improve the above discussed type of magnetic tape machine by horizontally enlarging the tape compartment and providing means to move the tape stack into the compartment enlargement.

Another object of the invention is to provide means for controlling the tape-stack moving-means in response to a condition of the stack which directly effects the preservation or lack of preservation of the smoothly curved folds of the stack. Thus, I have means to weigh the stack of tape and when the weight reaches a predetermined maximum, my control means either initiate or modify the actuation of a conveyer to move the stack of tape into (or from) the compartment extension.

In one form of my invention the lower part of the vertical compartment of the magnetic tape unit is horizontally extended and a flexible belt conveyer is provided at the bottom thereof. A set of weighing scales is at the bottom of the vertical portion of the compartment and the weighing scales are so arranged that when a sufficient predetermined weight is sensed by the scales, an electrical signal is provided for modifying the operation of the conveyer, for example, by starting the conveyer. Alternatively, the conveyer can be continuously operated and the electrical signal used as a servo accelerate (or decelerate) the conveyer.

One prior magnetic tape unit uses two narrow adjacent compartments for the tape folds, keeping them separated in two groups. The tape is either fed into or withdrawn from the compartments depending on the direction of movement of the tape. The ends of the tape are fixed, thereby making the unit an open-loop system.

In another embodiment of my invention, I have provided a closed-loop tape where the tape can be enormously long in comparison to currently used magnetic belts of the closed-loop type. This is accomplished with a single compartment provided with a balance beam weighing scale associated with a conveyer control at the bottom of the tape unit. The arrangement is such that the folds of tape form a copious tape supply on the conveyer, and the scales cause the conveyer to operate in either direction to move the tape folds left or right depending on the following requirements. When the conventional tape transport moves the tape in one direction tape is fed into one end of the supply of folds and is withdrawn from the other. The scales detect this and cause the conveyer to operate in one direction to help feed from the outgoing folds and make room for the incoming tape which forms new folds. When the tape transport operates in the opposite direction the conveyer operates correspondingly for the same reason.

Accordingly, another object of my invention is to provide a new kind of tape unit with ample tape capacity and with favorable stop, start and reversal characteristics made possible by very low inertia of the small quantity of tape between the tape transport and a loose supply of tape.

Other objects and features of importance will become apparent in following the description of the illustrated forms of the invention which are given by way of example only.

Figure 4:
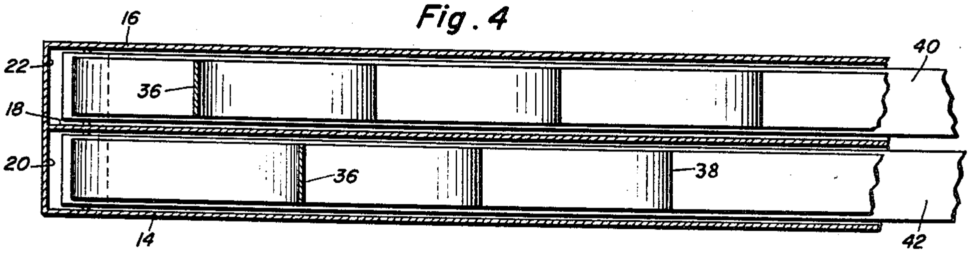
FIGURE 4 is a fragmentary sectional view taken on the line 4—4 of FIGURE 1.

Magnetic tape machine 10 (FIGURES 1–4) has a housing provided with a vertical part and a horizontally extending part 12 at the lower side thereof. The housing is constructed of front and rear walls 14 and 16 (FIGURE 4) and a vertical partition 18 which divides the housing into parallel compartments 20 and 22. The end, top and bottom walls of the housing and its extension are suitably connected to the front and rear walls.

Figures 1, 2, 3:
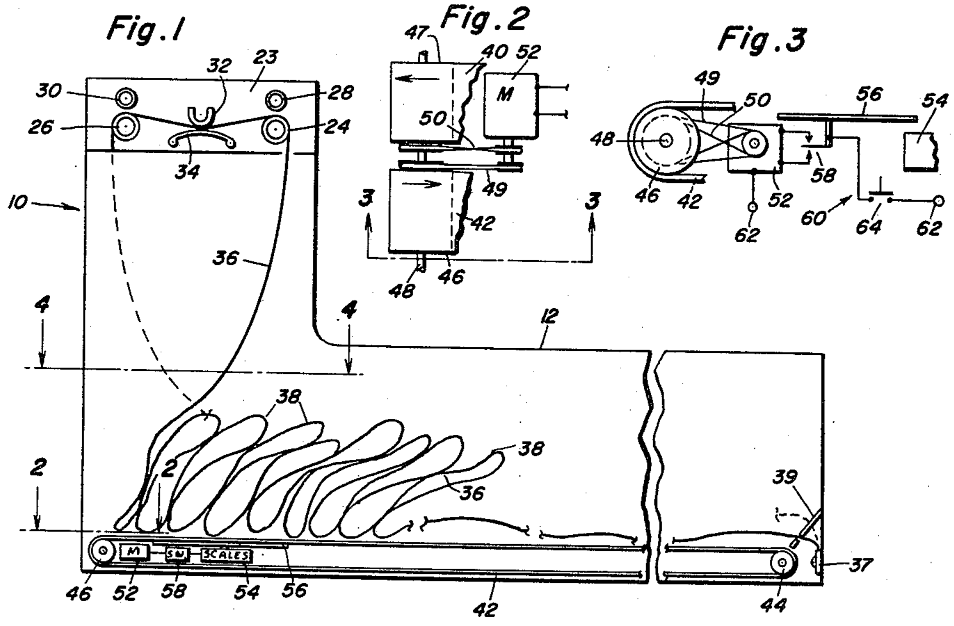
FIGURE 1 is an elevational view of a magnetic tape machine constructed in accordance with my invention.
FIGURE 2 is an enlarged sectional view taken on line 2—2 of FIGURE 1.
FIGURE 3 is a sectional view taken on line 3—3 of FIGURE 2.

The upper part of the housing contains conventional tape transport mechanisms 23 represented by capstans 24 and 26 with their associated pinch rollers 28 and 30. The capstans are driven by conventional drive motors, and the pinch rollers 28 and 30 are actuated by conventional means which respond to command signals emanating from an external machine or from the tape unit by actuation of switches. Magnetic head 32 is located between the capstans, and as is known in the art, one or more heads can be used. A tape pressure pad 34 is attached to the frame of machine 10 and retains the tape against head 32. The capstans and pinch rollers are horizontally offset a slight distance so that an intermediate portion of the magnetic tape 36 is fed or withdrawn directly vertically from compartment 20 or 22. The ends of the tape are fastened to the machine frame by clamp 37 behind tape-deflector 39 (FIGURE 1).

As discussed before, the space between walls 14, 16 and the compartment-subdividing partition 18 provides clearance for the width of the tape (FIGURE 4) to freely move in the compartments, but the clearance is insufficient for a tape fold 38 to twist or for one fold to move vertically alongside of another. Thus, when tape is fed into a compartment, it moves to the bottom thereof and as additional tape continues to feed therein, the tape flexes along the axis of least resistance (transversely across the tape) and forms the smoothly curved folds 38 (FIGURE 1). The tape doubles back upon itself and the fold-forming procedure continues building up a stack of doubled-back, smoothly-curved folds of different lengths. Due to normal tape-feeding operation, when the tape is being fed into compartment 20, another portion of the tape is withdrawn from compartment 22. When the tape is driven in the opposite direction by the actuated pinch roller and capstan of the tape transport, the tape is withdrawn from compartment 20 and fed into tape compartment 22 with similar folding.

Since the vertical height of the stack is limited by the resistance of the tape to becoming sharply creased, my invention makes use of the horizontal extensions 12 of the compartments in the following manner: a pair of endless belt conveyors 40 and 42 are located at the bottom of compartments 20, 22 and their extensions. Conveyers 40 and 42 are made of belts entrained over a pair of idler pulleys 44 (FIGURE 1) at one end of the compartment extensions, and driver rollers 46, 47 at the opposite end. Both pairs of rollers are mounted on spindles 48 connected with walls 14 and 16. The conveyers are actuated by a reversible motor 52 (FIGURES 1–3) coupled with rollers 46, 47 through a suitable transmission which drives roller 46 in one direction at the same time that roller 47 is driven in the opposite direction. Belts (e.g., O rings) 49, 50 engaging pulleys on the motor shaft and attached to rollers 46, 47 are suitable when one of the belts is crossed. Thus, conveyers 40 and 42 are automatically operated in opposite directions to simultaneously move folds 38 toward the pay-out capstan and make room for the incoming tape from the other capstan-roller combination. More particularly, as a vertical group of smoothly curved folds are formed in the compartment 20 below the capstan driver, they will be conveyed (to the right as shown in FIGURE 1) to occupy the lateral extension 12 of the tape compartment 20, and at the same time the folds in compartment 22 will be moved to the left in compartment 22.

The illustrated embodiments of my invention have a control for conveyer-actuation. One way to control conveyer actuation is to provide permanent instructions on the tape, for instance between blocks of information, and to read these instructions by the magnetic head 32 (or a special head) from which signals can be obtained to actuate (or accelerate) motor 52. Although this method is practical because the height of the stack of folds is approximately proportional to the length of tape passing the magnetic head, the expense for implementation is considerably greater than my illustrated arrangement. As shown in FIGURE 1, weighing scales 54 have a pan 56 beneath the upper flight of conveyer 42 directly below the vertical part of the housing. Thus, the scales sense the weight and amount of tape 36. Switch 58 is actuated by the movement of a weight responsive part of the scales, e.g., pan 56, and switch 58 is a part of control circuit 60 for motor 52. As mentioned before, motor 52 is reversible, and when energized in one of its two directions, it actuates both conveyers but simultaneously in opposite directions.

Circuit 60 has a power source 62 and a main control switch 64 which is manually or computer-operated. Switch 64 is connected in series with the movable contactor of switch 58. The fixed contacts of switch 58 are connected with the forward and reverse windings of motor 52. Obviously, other equivalent circuits (e.g., a D.C. motor and a reversing switch to replace motor 52 and switch 58) can be used. The operation of the circuit is apparent in FIGURE 3: when pan 56 senses little or no tape the pan moves up to its normal (no load) position causing switch 58 to close via its upper contact and the motor, causing motor 52 to operate in one direction. When pan 56 senses a predetermined load (by adjusting scales 54 or the contacts of switch 58) switch 58 is closed via its lower contact causing the motor to operate in the opposite direction. When the pan senses a load between the two extremes switch 58 remains open (shown). Obviously, I can interpose variable resistors in the circuit to obtain speed and/or variable servo control of motor 52.

Summarizing, the practical limit on the amount of tape that can be used in a magazine accumulator-type tape transport is established by the height at which the tape folds begin to crease. The form of my invention shown in FIGURE 1 greatly enlarges the capacity for tape storage by providing conveyers at the bottom of the tape compartments and sensing the weight of tape on one (or both, if desired) of them. The tape weight corresponds to the height (or lack of height) of the stack of tape-folds, and this information is used to operate the conveyers as aforesaid. Thus, considerably longer tape can be used because it is horizontally stored in my housing compartment extensions. However, the conveyers move the stored tape folds left and right (FIGURE 1) to facilitate withdrawing and feeding tape in the respective compartments as it is moved in the usual way by the tape transport 23.

Figure 5:
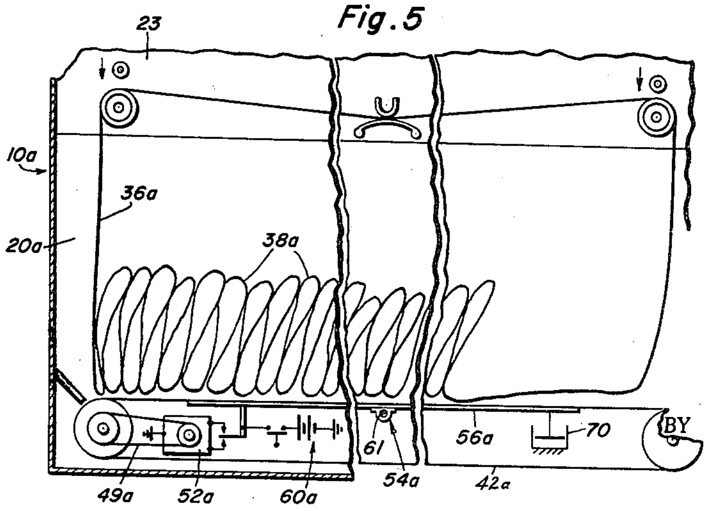
FIGURE 5 is a fragmentary vertical sectional view showing another embodiment of my invention.

FIGURE 5 shows another form of my machine 10*a* where the housing walls define a single compartment 20*a*. The tape transport capstan drivers, magnetic head and tensioning device are the same as in FIGURE 1. The main differences, apart from simplification, between machines 10 and 10*a*, are that the weighing scale 54*a* is a balanced beam type, tape 36*a* is a closed loop, and conveyer 42*a* is operated in a manner that the folds 38*a* become approximately centered between the ends of the conveyer. Structurally, machine 10*a* has the capstan drivers near the left and right end walls, and conveyer 42*a* is at the bottom of the machine housing. Weighing scale 54*a* has its pan 56*a* beneath and contacting the lower surface of the top flight of conveyer 42a. Pan 56a forms a balance bean which pivots about transverse spindle 61. Thus, the tilting of pan 56a indicates that more tape is being supported on one side or the other of spindle 61. For instance, with tape folds as shown in FIGURE 5 the left part of the pan 56a will move down to close switch 58a in a manner to cause the motor-operated conveyer to move the tape folds to the right. When the folds move to about the center of the compartment, switch 58a will open by the lifting of the adjacent end of pan 56a. If the tape transport moves the tape in a manner that it begins to pile up on the right side of the conveyer 42a, switch 58a will close through its upper contact to move the tape folds toward the center of compartment 20a. Thus, motor control circuit 60a is identical to circuit 60. Since only one conveyer 42a is involved, only one belt 49a (instead of crossed belts, FIGURE 3) and a pair of pulleys are required to couple the motor 52a to conveyer 42a.

Since the weight of the tape is sensed through (by deflection of) conveyer belts in the two illustrated forms of my invention, the pans of the scales are in light contact therewith. The belts of the conveyers are preferably quite flexible such as woven cloth. Although small oscillations of the pans of the scales will provide no difficulty, I have shown dashpot 70 (FIGURE 5) attached to pan 56a and to the frame of the machine to solve any potential oscillation problem. If desired, a dashpot can be similarly used in FIGURE 1.

It is understood that various additional changes, modifications and the like may be made without departing from the protection of the following claims.

I claim:

1. In a magnetic tape machine provided with a vertical compartment, a magnetic head at the upper part of the compartment, and forward and rearward drive means for the tape, said compartment having walls which are so spaced as to require the supply of tape in the compartment to form a vertical stack of doubled back smoothly curved folds in serpentine manner as the tape is fed into the compartment during operation of said drive means, the improvement comprising a substantially horizontal extension of said vertical compartment at the lower part thereof to enlarge the capacity for tape storage, and means for moving the lower part of the vertical stack of smoothly curved folds into said horizontal compartment extension to thereby prevent the stack from exceeding a height in said vertical compartment which is great enough to cause the bottom folds to be crushed.

2. In a magnetic tape machine provided with a vertical compartment, a magnetic head at the upper part of the compartment, means for driving said tape past said head in a selected forward or reverse direction, and said compartment having walls which are so spaced as to require the supply of tape in the compartment to form a vertical stack of doubled back smoothly curved folds as the tape is fed into the compartment during operation of said drive means, the improvement comprising a substantially horizontal extension of said vertical compartment at the lower part thereof to enlarge the capacity for tape storage, means for moving the lower part of the vertical stack of smoothly curved folds into said horizontal compartment extension to prevent the stack from exceeding a height in said vertical compartment which is great enough to cause the bottom folds to be crushed, and weighing means responsive to the weight of tape in said vertical compartment for effecting the operation of said moving means.

3. A magnetic tape unit comprising a housing having a vertical partition defining a pair of adjacent compartments, the width of the compartments being slightly in excess of the width of the magnetic tape, a magnetic head, drive means to move said tape selectively in a forward or reverse direction past said head, conveyer means in said compartments for moving a supply of said tape in one compartment in a first direction and for moving a supply of the tape in the other compartment in a second direction depending on the direction of operation of said drive means so that when said tape is accelerated it is withdrawn from the supply so that substantially the only resistance to tape movement at initial starting is derived from the weight of a comparatively small length of the tape from the drive means to the supply from which the tape is drawn.

4. The subject matter of claim 3 and means responsive to the weight of a portion of the tape for controlling the actuation of said conveyer means.

5. In a magnetic tape machine, tape transport means to move the tape in a selected forward or reverse direction, a housing in which to store a quantity of tape from which tape is drawn and into which tape is fed in response to actuation of said tape transport means, tape weight responsive means for moving said quantity of tape to a predetermined position within said housing, said weight responsive means including a weighing scale, a tape supporting conveyor disposed in said housing and operatively associated with said scale, and conveyor operating means responsive to the actuation of said weighing scale.

6. In a magnetic tape machine, tape transport means to move the tape in a selected forward or reverse direction, a housing in which to store a quantity of tape from which tape is drawn and into which tape is fed as a result of actuation of the tape transport means, tape weight responsive means to move said quantity of tape to a predetermined position within said housing, said weight responsive means including a weighing scale, a tape supporting conveyor operatively associated with said scale, conveyor operating means responsive to the actuation of said weighing scale, and said conveyor operating means having means to reverse the direction of motion of said conveying means.

7. In a magnetic tape machine, tape transport means to move the tape in a selected forward or reverse direction, a housing in which to store a quantity of tape from which tape is drawn and into which tape is fed in response to actuation of said tape transport means, tape weight responsive means for moving said quantity of tape to a predetermined position within said housing, said housing having separate compartments in which said quantity of tape is stored in stacks of smooth folds, and said tape quantity moving means including separate conveyors at the bottom of said compartments.

8. In a magnetic tape machine, tape transport means to move the tape in a selected forward or reverse direction, a housing in which to store a quantity of tape from which tape is drawn and into which tape is fed as a result of actuation of said tape transport means, said housing having separate compartments in which said quantity of tape is stored in stacks of smooth folds, tape weight responsive means for moving said quantity of tape to predetermined positions within said compartments, said tape quantity moving means including separate conveyors at the bottom of said compartments, means to actuate said conveyors in unison but in opposite directions, and means to reverse the operation of said conveyors.

9. In a machine for handling flexible tape, tape drive means to selectively move the tape in forward and reverse directions, an accumulator compartment for a buffer portion of the tape from which and into which the tape is moved by said drive means, weighing means including weighing scales to weigh said buffer portion of tape in said accumulator compartment, a conveyor for said tape portion, means for selectively operating said conveyor in one of two directions to correspondingly move the tape buffer portion within the compartment, and means responsive to said weighing means for actuating said conveyor operating means to move the conveyor in one of said two directions.

10. In a machine for handling magnetic tape and having a magnetic head structure, drive means to move part of the tape past said head in selected forward or reverse directions, a tape accumulator compartment containing a buffer portion of said tape arranged as a plurality of loops to which tape is fed and from which tape is drawn by said drive means, weighing means to weigh the buffer portion of the tape in a part of said compartment, and means responsive to said weighing means to relocate the tape buffer portion in said compartment to prevent the tape from excessively accumulating in a part of the compartment.

11. The machine of claim 10 wherein said means to relocate the tape buffer portion includes a conveyor and motor drive means to actuate said conveyor in a forward or a reverse direction.

12. The machine of claim 11 wherein said weighing means include weighing scales, and means including a control circuit responsive to the actuation of said weighing means to control said motor drive means.

13. In a machine for handling magnetic tape and having a magnetic head structure, tape transport means to drive the tape past said head structure selectively in a forward or reverse direction, a compartmented housing containing a buffer portion of the magnetic tape, said tape transport means drawing tape from a first end of said buffer portion and feeding tape into a second end of said buffer portion when the transport means drives said tape in the forward direction, and said transport means withdrawing the tape from said second end of said buffer portion and feeding tape into said first end of said buffer portion when said transport means drives said tape in the reverse direction so that the buffer portion of the tape accumulates in said compartmented housing at different positions depending on the direction of operation of said tape transport means, means to prevent excessive accumulation of tape at either of said buffer portion ends including a conveyor in said compartmented housing, weighing means to weigh the buffer portion in said housing, and means including an electric circuit operatively associated with said weighing means for actuating said conveying means to move the tape to a new position within said housing which prevents excessive tape accumulation at one end of said tape buffer portion.

References Cited by the Examiner

UNITED STATES PATENTS

| | | | |
|---|---|---|---|
| 2,180,601 | 11/39 | Mitchell | 226—4 |
| 2,482,497 | 9/49 | Miller | 226—26 |
| 2,979,244 | 4/61 | Pouliart | 226—118 |
| 3,078,056 | 2/63 | Alterman | 226—26 X |

SAMUEL F. COLEMAN, *Primary Examiner.*

ERWARD A. SROKA, *Examiner.*